(12) United States Patent
Strawn et al.

(10) Patent No.: US 7,770,791 B2
(45) Date of Patent: Aug. 10, 2010

(54) SECURITY DEVICE

(75) Inventors: Andrew Strawn, Fleet (GB); Nigel Richardson, Farnham (GB)

(73) Assignee: Nokia Corporation, Espoo (FI)

( * ) Notice: Subject to any disclaimer, the term of this patent is extended or adjusted under 35 U.S.C. 154(b) by 835 days.

(21) Appl. No.: 11/152,374

(22) Filed: Jun. 15, 2005

(65) Prior Publication Data

US 2006/0000902 A1    Jan. 5, 2006

(30) Foreign Application Priority Data

Jun. 30, 2004    (GB) ................. 0414669.2

(51) Int. Cl.
*G06K 5/00* (2006.01)
(52) U.S. Cl. .................................... 235/382
(58) Field of Classification Search ................ 235/382; 455/573, 411, 554.2, 426.2
See application file for complete search history.

(56) References Cited

U.S. PATENT DOCUMENTS

| 5,500,888 | A | * | 3/1996 | Chiu et al. | ................ 455/410 |
| 6,429,622 | B1 | | 8/2002 | Svensson | |
| 6,775,563 | B2 | * | 8/2004 | Younis | ................ 455/573 |
| 6,989,732 | B2 | * | 1/2006 | Fisher | ................ 340/3.1 |
| 2002/0180582 | A1 | * | 12/2002 | Nielsen | ................ 340/5.6 |
| 2003/0039360 | A1 | | 2/2003 | Younis | |
| 2004/0236964 | A1 | * | 11/2004 | Haverinen | ................ 713/201 |
| 2006/0294387 | A1 | | 12/2006 | McCracken | |

FOREIGN PATENT DOCUMENTS

| GB | 2 384 942 | 8/2003 |
| GB | 2 387 998 | 10/2003 |
| GB | 2 396 261 | 6/2004 |

* cited by examiner

*Primary Examiner*—Daniel A Hess
(74) *Attorney, Agent, or Firm*—Mintz, Levin, Cohn, Ferris, Glovsky and Popeo, P.C.

(57) ABSTRACT

A portable electronic device comprising a service provision unit capable of providing a service to a user, a communication unit capable of receiving authorization data from an authorization device and a validation unit capable of analyzing the received authorization data to determine whether it meets a validation requirement and being arranged to inhibit provision of the service by the service provision unit if the authorization data does not meet the validation requirement, the communication unit being arranged to receive authorization data from the authorization device and the validation unit being arranged to analyze the received authorization data whenever the communication unit and the authorization device are capable of communicating with each other.

20 Claims, 3 Drawing Sheets

SECURITY DEVICE

BACKGROUND OF THE INVENTION

This invention relates to a security device for a portable device, in particular for a portable device such as a mobile phone or portable games console. The portable device is rendered inoperable if it does not exchange security information with the security device at regular intervals.

Portable devices such as mobile phones are becoming ever more sophisticated. For example, portable gaming devices are available that combine a game deck with a mobile phone, mobile browser and PDA, MP3 player and other such devices. Unfortunately, such portable devices are attractive to thieves as well as to consumers. Mobile phone theft is already a common problem. With the increasing functionality of portable devices the number of thefts could increase.

The majority of mobile phones contain an identification chip, known as a SIM card, which operates e.g. to identify the user of the mobile phone to a telecommunications network. The SIM card can be disabled by the network in the event that a mobile phone is reported stolen. SIM cards may also be contained in other portable devices. However, a device containing a SIM card may be reactivated by simply replacing the existing SIM card with a new SIM card. Furthermore, portable devices that offer multiple functionality may not require a SIM card for some modes of operation e.g. for playing games.

Although security features such as passwords or pin numbers can be used to protect portable devices, in practice many users fail to take advantage of these security features. Users tend to find entering passwords or pin numbers, which typically have to be entered every time the device is switched on, annoying and time-consuming.

Security or copyright protection devices, known as 'dongles', are available to protect commercial software. The dongle is connected to one of the I/O ports of a computer while the program is running. Programs that require a dongle query the I/O port to which the dongle is connected at start-up and at predetermined intervals thereafter. The program is terminated if the dongle does not respond to the queries with the expected validation code. Therefore, although the dongle does not prevent users from copying the program, it does mean that any copy cannot be run without purchasing the required dongle from the program manufacturer.

The application of dongles described above requires that the dongle be attached to the device running the software for the duration that the software is operated. This would not prevent the theft of portable devices. If the dongle had to be attached to the portable device during use, then a thief would obtain both the dongle and the portable device by stealing portable devices that were being used by their owners. Also, rather than separate the dongle from the portable device when the device is not in use, for convenience users would tend to leave a separable dongle permanently attached to the device.

Radio Frequency Identification (RFID) may be used as a method of automatic identification. Data is carried in suitable transponders (RFID tags). The data carried by the RFID tag may be read or written to by radio signals emitted by an antenna. The data within an RFID tag may provide identification of an object to which the tag is attached. A system for identifying objects in this way requires RFID tags, a means for reading or interrogating the tags and a means for communicating the data to a host computer or information management system.

SUMMARY OF THE INVENTION

There is a need for a security device that renders portable devices less attractive to thieves.

According to one embodiment of the present invention, there is provided a portable electronic device comprising, a service provision unit capable of providing a service to a user, a communication unit capable of receiving authorisation data from an authorisation device and a validation unit capable of analysing the received authorisation data to determine whether it meets a validation requirement and being arranged to inhibit provision of the service by the service provision unit if the authorisation data does not meet the validation requirement, the communication unit being arranged to receive authorisation data from the authorisation device and the validation unit being arranged to analyse the received authorisation data whenever the communication unit and the authorisation device are capable of communicating with each other.

The communication unit may be capable of receiving authorisation data over a wired connection. Alternatively, the communication unit may be capable of receiving authorisation data from the authorisation device over a wireless connection.

The authorisation device may be a dongle. Alternatively, the authorisation device may be a Radio Frequency Identification tag.

Preferably the validation unit is capable of monitoring the portable electronic device for the presence of a trigger condition and is arranged to inhibit the service provision unit from providing the service if the trigger condition is present. The trigger condition may be present if at least a predetermined length of time has elapsed since the validation unit last analysed received authorisation data which met the validation requirement. The device may comprise a battery. The trigger condition may then be present if the battery needs charging.

The communication unit may be arranged to receive authorisation data comprising a first randomly generated code from the authorisation device.

The validation unit may be arranged to store a security code and the authorisation data will then meet the validation requirement if the first randomly generated code is identical to the stored security code. The communication unit may be arranged to receive further authorisation data comprising a second randomly generated code from the authorisation device if the authorisation data meets the validation requirement and the validation unit is arranged to store the second randomly generated code as the stored security code. Alternatively, the validation unit may be arranged to treat the first randomly generated security code as a public key and to apply a function to that key according to a public/private key protocol. The communication unit may be arranged to receive further authorisation data comprising a calculated value from the authorisation device, the validation unit being arranged to analyse said calculated value in accordance with the public/private key protocol such that the validation requirement is met if the calculation data satisfies the requirements of the public/private key protocol.

According to a second embodiment of the present invention, there is provided a portable electronic apparatus comprising a power source, communication unit capable of receiving authorisation data from an associated device and a validation unit capable of analysing the received authorisation data to determine whether it meets a validation requirement and being arranged to inhibit a function of the power source if the authorisation data does not meet the validation requirement, the communication unit being arranged to receive authorisation data from the associated device and the validation unit being arranged to analyse the received authorisation data whenever the communication unit and the associated device are capable of communicating with each other.

According to a third embodiment of the present invention, there is provided a radio telephone comprising a power source, a communication unit capable of receiving authorisation data from an associated device and a validation unit capable of analysing the received authorisation data to determine whether it meets a validation requirement and being arranged to inhibit a function of the power source if the authorisation data does not meet the validation requirement, the communication unit being arranged to receive authorisation data from the associated device and the validation unit being arranged to analyse the received authorisation data whenever the communication unit and the associated device are capable of communicating with each other.

The power source may be a battery capable of being charged by a charging device, the associated device may be the charging device and the function of the power source may be charging of the power source.

According to a fourth embodiment of the present invention, there is provided an authorisation device together with a portable electronic device as claimed in any preceding claim, the authorisation device being capable of communicating with the communication unit of the portable electronic device and being arranged to provide authorisation data to the communication unit.

According to a fifth embodiment of the present invention, there is provided a charging device comprising a voltage converter unit capable of outputting a voltage to a portable electronic device during a charging operation, a security unit capable of generating authorisation data and a communication unit capable of communicating said authorisation data to the portable electronic device whenever the communication unit and the portable electronic device are capable of communicating with each other.

The authorisation data may be a randomly generated code. Alternatively, the security unit may be capable of applying a function to a randomly generated code to generate authorisation data such that the authorisation data represents a public key in a public/private key protocol.

Preferably, the communication unit is capable of receiving an acknowledgement signal from the portable electronic device.

According to a fifth embodiment of the present invention, there is provided a program for a portable electronic device comprising a service provision unit capable of providing a service to a user, the program being executable for providing a service to the service provision unit, receiving authorisation data from an authorisation device whenever a communication unit of the portable electronic device and a security device are capable of communicating with each other, analysing the authorisation data to determine whether it meets a validation requirement and inhibiting the service from being provided to the service provision unit if the authorisation data does not meet the validation requirement.

According to the a sixth embodiment of the present invention, there is provided a data carrier storing a program.

According to a seventh embodiment of the present invention, there is provided a method of validating a portable electronic device comprising the following steps: providing a service to a user via a service provision unit, receiving authorisation data from an authorisation device via a communication unit and analysing the received authorisation data to determine whether it meets a validation requirement via a validation unit, the validation unit inhibiting provision of the service by the service provision unit if the authorisation data does not meet the validation requirement and the authorisation data being received by the communication unit from the authorisation device and the received authorisation data being analysed by the validation unit whenever the communication unit and the authorisation device are capable of communicating with each other.

DESCRIPTION OF THE DRAWINGS

The present invention will now be described by way of example, with reference to the accompanying drawings, in which.

DETAILED DESCRIPTION OF THE INVENTION

According to an embodiment of the present invention, a portable device is provided with a separate security device with which the portable device must communicate at regular intervals. Communication between the portable device and the security device allows a validation operation to be performed. During the validation operation data is exchanged between the portable device and the security device. If the correct data is exchanged then the portable device is validated and will continue to work. However, if the correct data is not exchanged, then the portable device will no longer operate.

Typically the portable device will provide at least one service e.g. gaming, internet access, telephone calls etc to the user. Each service can be considered as being provided by a "service provision unit", which may be implemented in hardware or software, or a combination of both. The service provision units may be distinct, separate units within the portable device or they may alternatively overlap, for example sharing components or software with other units. If the validation operation performed by the portable device fails, then at least one of the service provision units is disabled, so that the service provided to the user by that unit is unavailable. Preferably the service or services that are disabled if validation fails are vital to normal operation of the portable device, such that the device is rendered useless if not validated at regular intervals. Both the portable device and the security device are equipped with means for communicating with each other. Communication between the two devices may be either wired or wireless.

Figure 1:
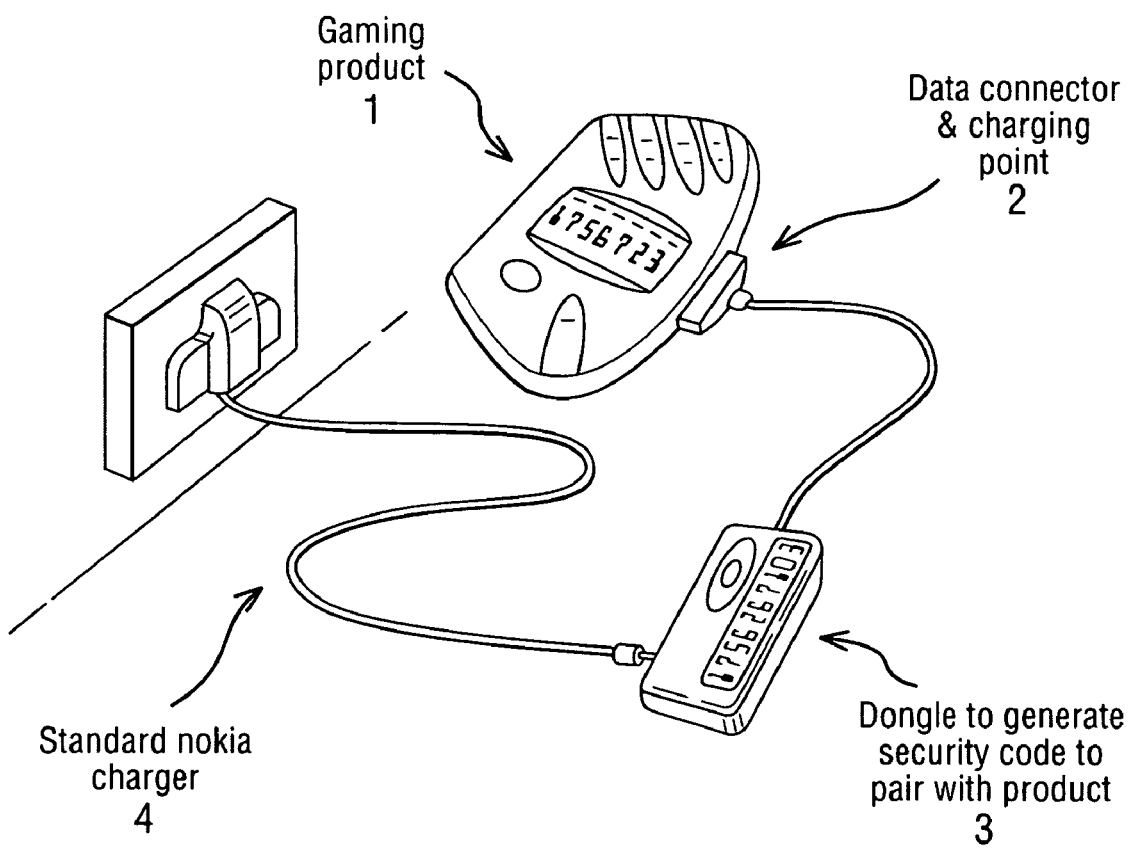
FIG. 1 illustrates a portable device that is connected to a security device during charging.

FIG. 1 illustrates an embodiment in which the security device is a dongle. The dongle (3) is fitted to a standard charger (4) and is connected to the portable device (1) via the data connector and charging point (2) of the portable device during charging. In FIG. 1 the portable device shown is a gaming product. This is for the purposes of example only and it should be understood that the present invention is not limited to any particular type of portable device.

In general, the dongle generates random numbers that act as security codes for the validation operation. Every time the portable device is charged, the dongle provides the portable device with a new, randomly generated, security code. The security code is stored by the portable device. The portable device also queries the dongle for the security code supplied during the previous charging procedure. If the security code provided by the dongle does not match the code contained in the memory of the portable device, then the portable device will not allow its battery to be charged.

Figure 2:
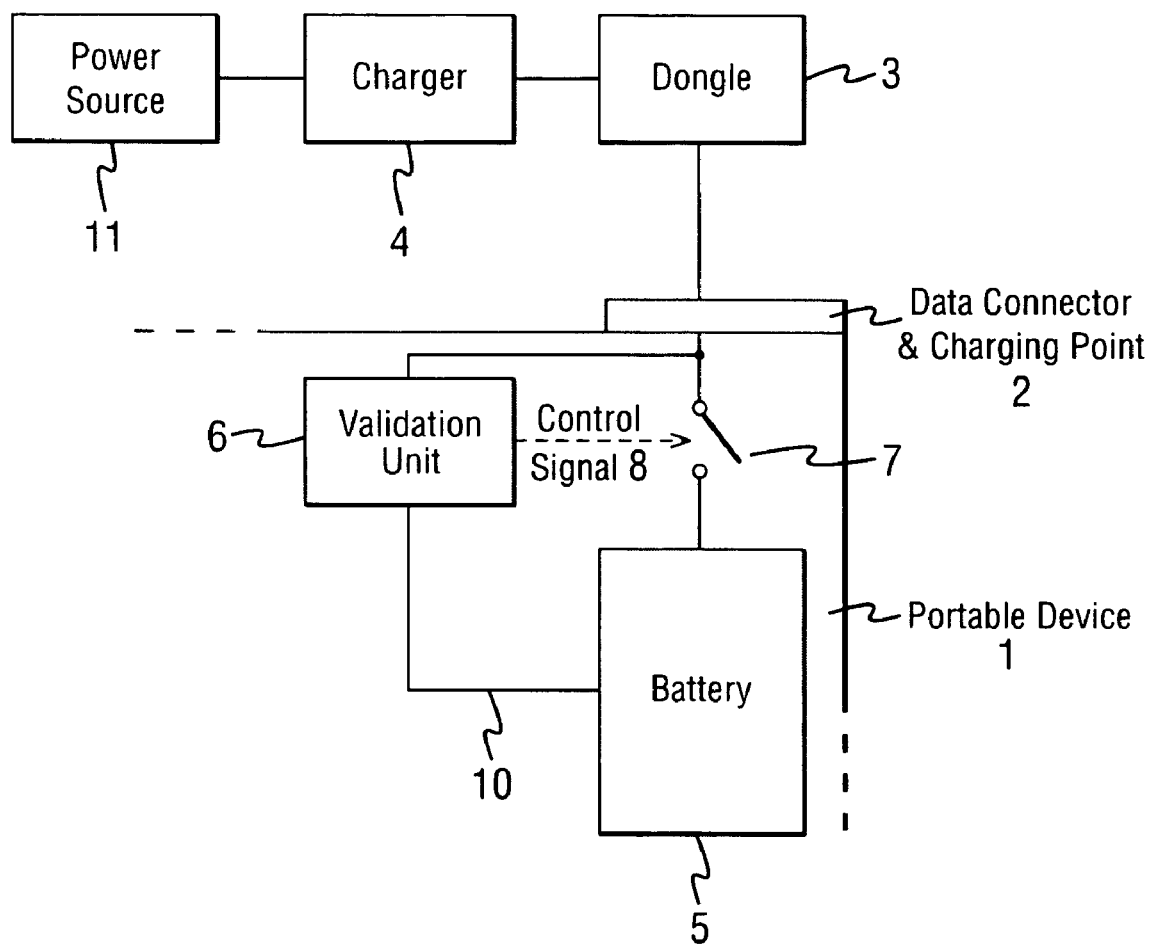
FIG. 2 illustrates the components required for a validation operation during charging.

FIG. 2 shows the components involved in the validation operation. The portable device (1) contains a validation unit (6) for receiving security codes generated by the dongle (3) and for comparing received codes with previously stored codes. The validation unit could be, for example, a microprocessor. The validation unit need not be a separate unit but could, for example, be implemented in an existing microprocessor contained in the portable device.

The portable device contains a switch (7), which can isolate the portable device from the power supply (11). The default position of the switch may be open or closed. The switch position is controlled by a control signal (8), which is generated by the validation unit. If the default position of the switch is closed, then the battery (5) of the portable device is connected to the power supply when the charger (4) is connected to both the power supply and the charging point (2) of the portable device. In this embodiment, the battery begins to charge immediately, before the validation operation is completed. The validation operation begins when the portable device is connected to the power source. If the validation operation fails to validate the portable device, then the validation unit outputs a control signal to open the switch and disconnect the portable device from the power source. Preferably, the validation operation is performed quickly so that if the validation operation fails the battery is insufficiently charged for the portable device to be operational. Alternatively, if the default position of the switch is open, then the portable device is initially isolated from the power supply and the battery will not start to charge until the portable device has been successfully validated and the validation unit has output a control signal to close the switch. This implementation assumes there is sufficient charge left in the battery of the portable device to complete the validation operation.

The validation operation described above could be circumvented by changing the battery of the portable device when it needs charging. The battery could be changed completely or could be transferred to another device for charging. For example, an identical portable device for which the thief has the required security device could be used to charge batteries of stolen devices. In one embodiment, the portable device may be provided with a battery that is sealed to the body of the portable device such that it is difficult to remove. Alternatively, the validation unit may be connected (10) to a battery having an identity. For example, the battery may contain a chip that stores the identity of the battery. The validation unit can then perform an identification operation to check that the identity of the battery and the portable unit correspond. This operation may be performed at switch-on and also preferably during the validation operation, to prevent the portable device being used to charge a battery belonging to a different device.

Alternatively, if the validation fails, the portable device can be rendered inoperable by means other than preventing charging, e.g. by disabling the communication or gaming part of the device until such a time as correct validation is performed. This implementation avoids the need for a battery sealed in the body of the device, a battery having an identity, or situations where the battery has insufficient charge to complete the validation operation. The validation process is still performed when the portable device is connected to the power source for charging.

The device may be programmed to require a new security code at predetermined intervals (which will typically be longer than the usual time period between charging of a regularly used device), to ensure the device at least undergoes a validation operation at some minimum frequency. The user will be informed that a new security code is required e.g. via a message displayed on the display of the portable device. After a predetermined period of time the portable device is rendered inoperable until a new security code is provided.

Figure 3:
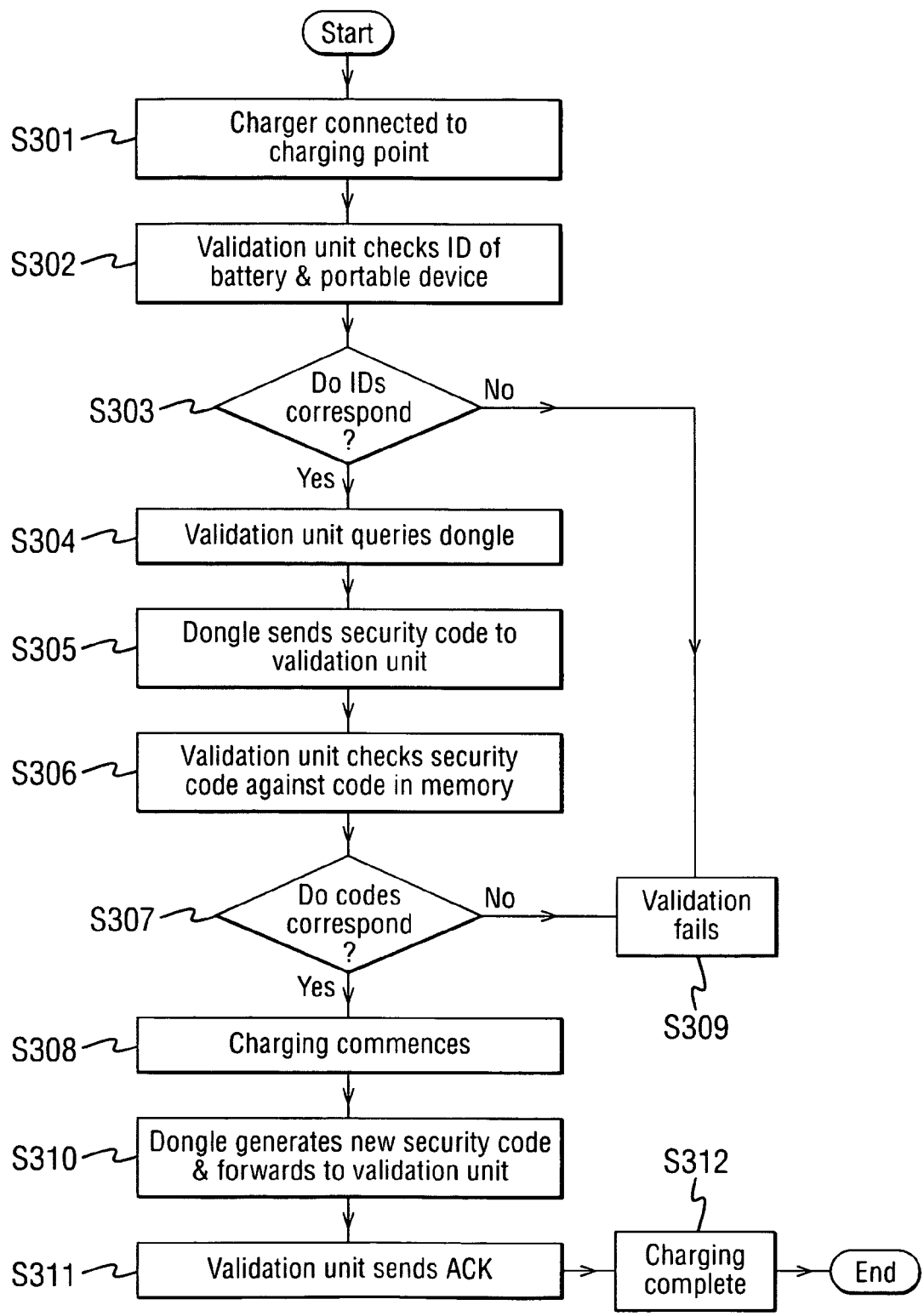
FIG. 3 illustrates the steps involved in a validation operation.

The validation operation performed using a dongle connected to a charger consists of the following steps, which are illustrated in FIG. 3. In step S301 the charger is connected to the data connector and charging point of the portable device. Preferably the validation unit performs an identification operation in step S302, to check whether or not the identification of the battery matches that of the phone. If the answer to this question (step S303) is no and the identity of the battery is not acceptable for the identity of the portable device, then the validation operation fails and the charging operation is halted (step S309). If the answer to this question is yes and the identification of the battery is acceptable, then the validation unit queries the dongle for the validation code in step S304. The dongle responds by sending the most recent security code to the validation unit in step S305. The validation unit checks the received security code against the security code stored in its memory in step S306. The security code is validated by checking whether or not it is identical to the code stored in memory (step S307). If the codes are not identical then the validation operation fails and the charging operation is halted (step S309). However, if the codes are found to be identical then the charging operation commences (or is allowed to continue) in step S308. In step S310 the dongle generates a new random security code, which it forwards to the validation unit. The validation unit acknowledges receipt of the new security code in step S311. The validation unit stores this code and uses it as the security code for the next validation operation it performs. In step S312, the charging operation is complete and the portable device will be charged and ready for use.

The validation operation described above may be performed only once or may be performed repeatedly during the charging procedure.

The validation operation described above describes the validation operation being substantially carried out by the validation unit of the portable device e.g. it is the validation unit that compares the received value with the stored security code.

However, the validation operation could equally be achieved by the dongle requesting the stored security code from the validation unit of the portable device, comparing the received security code with its stored security code and sending a signal to the validation unit to indicate whether or not the two codes are identical. However, this is not a preferred way of implementing the present invention because if it could be ascertained how the dongle indicated a successful validation to the portable device, then it would be a fairly simple matter to manufacture fake dongles to circumvent the security protection provided by the dongles.

Using a dongle that is connected to a standard charger enables the validation operation to be performed without any participation from the user. As the battery of the portable device naturally requires periodic recharging after the portable device has been used, the requirement that the portable device undergo regular validation operations to remain operational does not require the user to perform any additional actions than would be required of a user of any existing portable device.

A typical battery for a portable device might be expected to last about 15 hours before requiring recharging. The frequency with which the device is recharged and therefore validated will vary depending on the frequency and duration for which the device is used. According to the embodiment described above, in which the portable device is programmed to require a new security code at least every predetermined time period, a suitable such predetermined period may be e.g. a week. This is given as an example only and the actual predetermined period will be determined by balancing the desired deterrent to thieves with the inconvenience caused to legitimate users.

Figure 4:
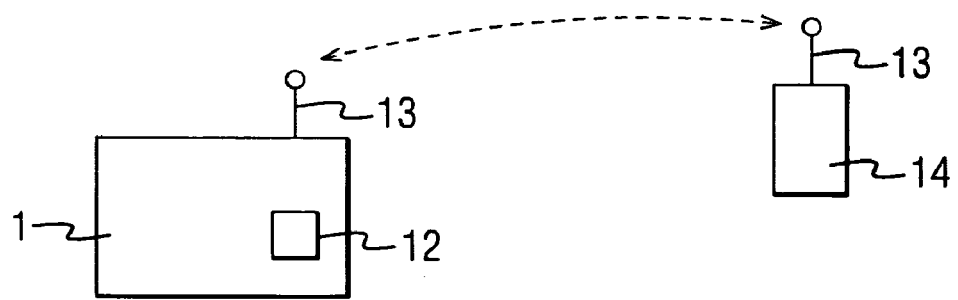
FIG. 4 illustrates an alternative implementation using an RFID system.

A security device for validating portable devices according to the present invention is not limited to dongles. For example, an RFID system might be used. In this implementation, shown in FIG. 4, the portable device comprises an RFID tag (12), which can communicate wirelessly with an RFID reader/interrogator (14) via an antenna (13). The RFID reader/interrogator is the security device. It provides the RFID tag contained in the portable device with randomly generated security codes, interrogates the RFID tag for the existing security codes and checks whether or not the security code provided by the RFID tag is identical to that stored by the RFID reader/interrogator. If the security codes are not identical then the RFID reader/interrogator transmits a signal to this effect to the RFID tag and the portable device is rendered inoperable. The RFID tag may also identify the portable device to the RFID reader/interrogator.

The RFID tag communicates with the RFID reader/interrogator when the two are in range of each other. Normally this will be a distance of a few centimeters.

In order that the validation operation is carried out at regular intervals, the portable device requires that the validation operation be carried out at predetermined intervals of time. This could be implemented, for example, in the software of the portable device. The user will be informed that the portable device must undergo a validation operation and receive a new security code within a predetermined time limit through onscreen commands. After the expiration of the time limit, the portable device will be rendered inoperable until it undergoes a validation operation and receives a new security code. A validation operation might be required e.g. once a week.

The portable device is not limited to how many validation operations it may carry out in a particular time period. Communication between the portable device and the security device is opportunistic so that the two devices communicate whenever they are capable of doing so. Therefore, the portable device may undergo a validation operation e.g. every time that the dongle is connected to the device or every time that the portable device is close enough to the RFID tag.

The security devices described above are given as examples only. The present invention is intended to encompass all appropriate devices that can periodically exchange security information with a portable device for the purposes of validating the portable device. For example, other wireless technologies such as Bluetooth®, wireless local area networks (WLAN), infrared (IR) etc could be used.

As an alternative to the straightforward validation operation described above, a more complex authentication protocol may be employed such as the public key or challenge response protocol. In a protocol of this type both the portable device and the security device store identical security codes and a complex function. The complex function defines some mathematical operation, which is performed on the security code and requires an authentication value. The authentication value is generated randomly by the security device and forwarded to the validation unit of the portable device. The validation unit calculates the complex function of the security code and the authentication value. The security device also performs the same calculation. The answers to the calculations are compared, either in the security device or the validation unit, and if they are not identical the validation process fails.

The security device of the present invention can provide a low cost option for inhibiting the theft of portable devices. A portable device that will become inoperable unless it performs a regular validation operation with a security device is unattractive to thieves without the security device. If the portable device is stolen, it has no "street value" because it will become disabled after a relatively short period of time. Also, as the portable device having this security feature need only undergo the validation operation at reasonable intervals of time, users will not tend to carry the security device with them. Therefore, the chances of the portable device and the security device being stolen together are low. This is particularly true when the user of the portable device is a child, in which case an adult can keep hold of the security device thereby reducing the likelihood that the portable device will be stolen e.g. at school.

The present invention has been described in relation to a portable device such as a portable gaming deck. However, it could be used with many other devices, e.g. mobile phones, PDAs, MP3 players etc. In addition there are many other ways in addition to those described specifically above in which the portable device may react when if a validation operation fails or if it is not carried out when required. For example, the device may transmit a message e.g. to the user's mobile phone or to the device manufacturer, to indicate that it has been stolen. The portable device may also continue to offer a limited functionality after validation fails or is not carried out e.g. only specific functions may be disabled, such as gaming or the ability to communicate over a telecommunications network.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A method comprising:
performing a first validation operation based on a first generated code previously communicated between an authorization device and a user device separate to the authorization device;
determining that the first validation operation is successful and enabling provision of one or more services by said user device;
storing a second generated code communicated between said authorization device and said user device in preparation for a second validation operation at a later time;
performing said second validation operation based on said second generated code;
treating the first generated code as a public key;
applying a function to the public key according to a public/private key protocol;

receiving a calculated value from the authorization device;
analyzing said calculated value in accordance with the public/private key protocol; and determining that the first validation operation is successful if the calculated value satisfies the requirements of the public/private key protocol.

2. The method as claimed in claim 1, wherein the first and second generated codes are communicated between said authorization device and said user device over a wired connection.

3. The method as claimed in claim 1, wherein the first and second generated codes are communicated between said authorization device and said user device over a wireless connection.

4. The method as claimed in claim 1, further comprising:
after said enabling said provision of one or more services by said user device, monitoring for a presence of a trigger condition, detecting that said trigger condition is present, and inhibiting said user device from providing said one or more services until successful completion of said second validation operation.

5. The method as claimed in claim 4, wherein the trigger condition is present if at least a predetermined length of time has elapsed since successful completion of the first validation operation.

6. The method as claimed in claim 4, wherein the user device comprises a battery and the trigger condition is present if the battery needs charging.

7. The method as claimed in claim 1, wherein the authorization device comprises a dongle.

8. The method as claimed in claim 1, wherein the authorization device comprises a Radio Frequency Identification tag.

9. An apparatus comprising:
a validation unit configured to perform a first validation operation based on a first generated code previously communicated between an authorization device and a user device separate to the authorization device, wherein the validation unit is further configured to treat the first generated code as a public key and apply a function to the public key according to a public/private key protocol, to receive a calculated value from the authorization device, and to analyze the calculated value in accordance with the public/private key protocol, and wherein the first validation operation is determined to be successful if the calculated value satisfies the requirements of the public/private key protocol;
an enabling unit configured to enable provision of one or more services by the user device in dependence on the first validation operation being successful;
a storing unit configured to store a second generated code communicated between the authorization device and the user device in preparation for a second validation operation at a later time; and
wherein the validation unit is further configured to perform the second validation operation based on the second generated code.

10. The apparatus as claimed in claim 9, wherein the first and second generated codes are communicated between said authorization device and said user device over a wired connection.

11. The apparatus as claimed in claim 9, wherein the first and second generated codes are communicated between said authorization device and said user device over a wireless connection.

12. The apparatus as claimed in claim 9, further comprising a monitoring unit configured to monitor for a presence of a trigger condition after said enabling provision of said one or more services by said user device in dependence on the first validation operation being successful; and an inhibiting unit configured to inhibit the service provision unit from providing said one or more services if the trigger condition is present until successful completion of said second validation operation.

13. The apparatus as claimed in claim 12, wherein the trigger condition is present if at least a predetermined length of time has elapsed since successful completion of said first validation operation.

14. The apparatus as claimed in claim 12, wherein the user device comprises a battery and the trigger condition is present if the battery needs charging.

15. The apparatus as claimed in claim 9, wherein the authorization device comprises a dongle.

16. The apparatus as claimed in claim 9, wherein the authorization device comprises a Radio Frequency Identification tag.

17. A computer program, embodied on a computer readable medium, the computer program configured to control a processor to perform operations comprising:
performing a first validation operation based on a first generated code previously communicated between an authorization device and a user device separate to the authorization device;
determining that the first validation operation is successful and enabling provision of one or more services by the user device;
storing a second generated code communicated between the authorization device and the user device in preparation for a second validation operation at a later time; and
performing the second validation operation based on the second generated code;
treating the first generated code as a public key;
applying a function to the public key according to a public/private key protocol;
receiving a calculated value from the authorization device;
analyzing the calculated value in accordance with the public/private key protocol; and
determining that the first validation operation is successful if the calculated value satisfies the requirements of the public/private key protocol.

18. The computer program as claimed in claim 17, which is further configured to control the processor to perform the following operations:
monitoring for a presence of a trigger condition after said enabling said provision of one or more services by said user device;
detecting that said trigger condition is present; and
inhibiting said user device from providing said one or more services until successful completion of said second validation operation.

19. The computer program as claimed in claim 17, which is further configured to control the processor to perform the following operations:
determining that the trigger condition is present if at least a predetermined length of time has elapsed since successful completion of the first validation operation.

20. The computer program as claimed in claim 17, which is further configured to control the processor to perform the following operations:
determining that the trigger condition is present if a battery of said user device needs charging.

* * * * *